Oct. 8, 1957 B. A. ANDERSSON 2,809,046
FOLDING LUGGAGE RACK AND TRAILER FOR MOTOR CARS
Filed April 29, 1955 4 Sheets-Sheet 1
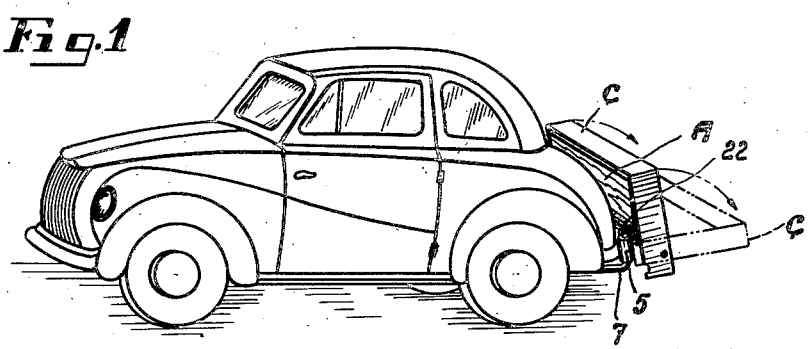
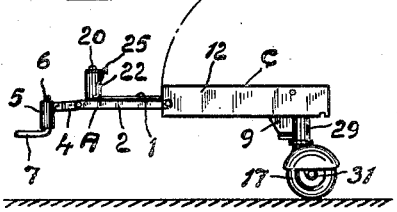
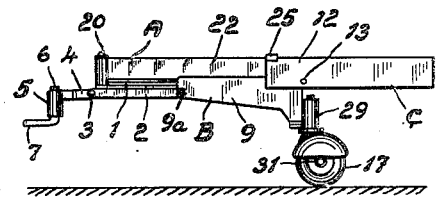
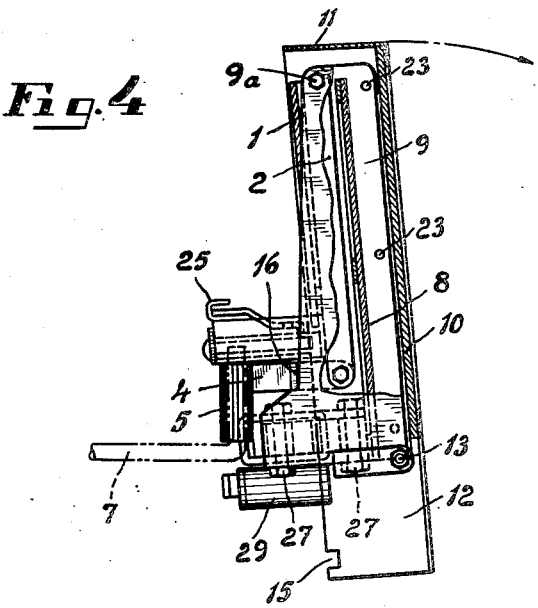
INVENTOR
BROR ADOLF ANDERSSON
BY Linton and Linton
ATTORNEYS Oct. 8, 1957 B. A. ANDERSSON 2,809,046
FOLDING LUGGAGE RACK AND TRAILER FOR MOTOR CARS
Filed April 29, 1955 4 Sheets-Sheet 2

INVENTOR
BROR ADOLF ANDERSSON
BY
ATTORNEYS

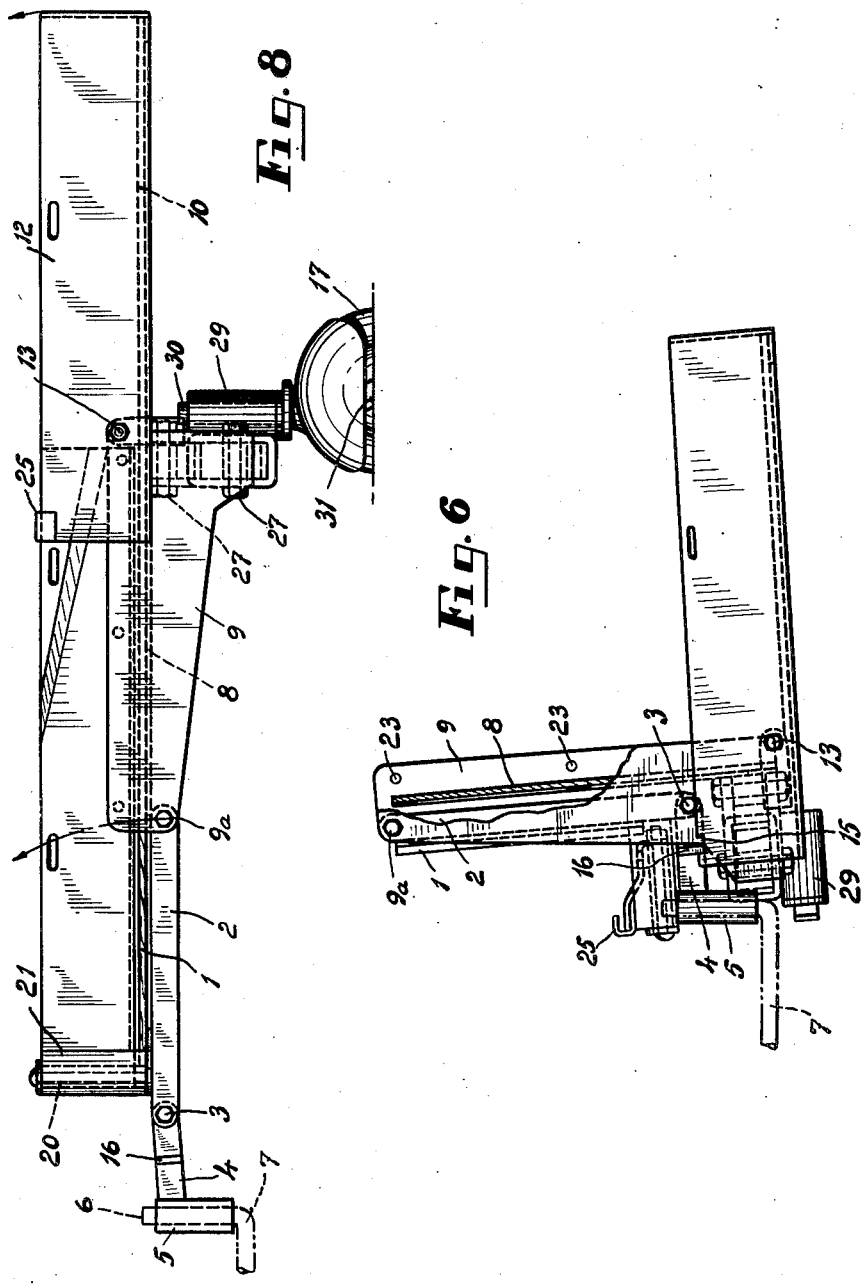

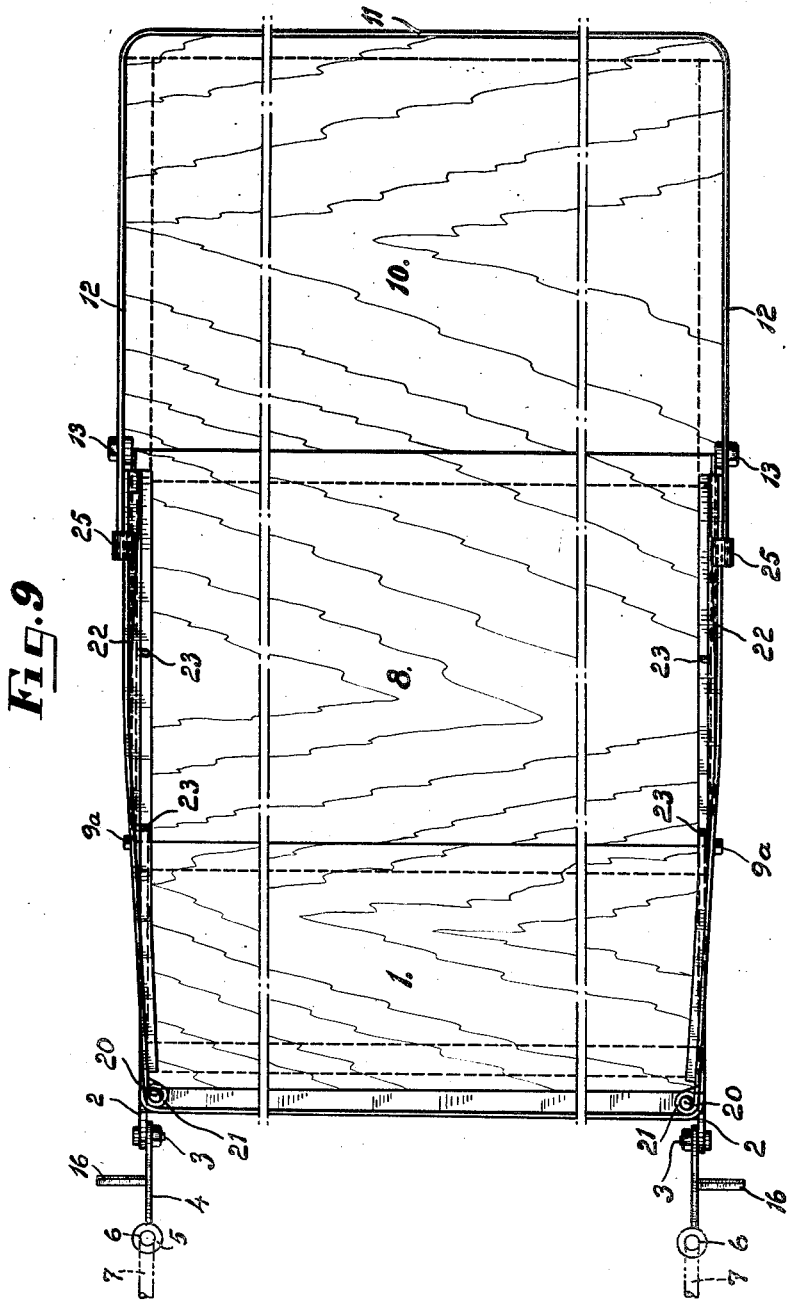

United States Patent Office 2,809,046
Patented Oct. 8, 1957

2,809,046

FOLDING LUGGAGE RACK AND TRAILER FOR MOTOR CARS

Bror Adolf Andersson, Boras, Sweden

Application April 29, 1955, Serial No. 504,820

5 Claims. (Cl. 280—34)

The present invention relates to luggage racks for motor cars of the kind comprising mutually articulated rectangular sections of which one is hinged at one transverse edge thereof to the rear end of the chassis or body of the motor car whereby, from a substantially vertical position in which the rack sections are folded together, the sections are extensible into a subtantially horizontal position of use in which the sections are supported by a detachable road wheel.

The invention has for its object to provide a luggage rack of the kind described which is simple in construction and which enables a larger or smaller load carrying surface to be obtained as required.

The invention is mainly characterized in that the luggage rack is composed of an intermediate section and two end sections of which one end section, at its front end, is articulated about a transverse horizontal axis to the rear end of the car, the intermediate section, at its front end, is articulated about a transverse horizontal axis to said end section, and the other end section, at its front portion, is articulated about a transverse horizontal axis to the rear end of the intermediate section, and in such a manner that, from the collapsed position of all three sections, either the rear end section alone is extensible into a horizontal position for forming a relatively small load carrying surface, a pair of recesses provided in the front end of the last-mentioned end section then engaging a pair of stop abutments provided at the rear end of the car for supporting said end section, or all of the sections are extensible for forming a larger horizontal load carrying surface, the supporting road wheel being then mounted at the rear of the intermediate section.

In one embodiment of the invention where the end section connected to the car is provided with side walls, the latter may be hinged on pins so disposed at those corners of said end section which are foremost in its horizontally extended position that said side walls are pivotable about said pins into a position parallel with the transverse edge of said end section which is situated adjacent the chassis of the car.

The pivotable side walls suitably are of such a length that, in a position in which they are extended along the side edges, respectively, of the end section connected to the car and with the intermediate section horizontally extended rearwardly of said end section, they also extend along the inside of side-plates provided on the intermediate section.

In this case the side-plates of the intermediate section may suitably have associated therewith inwardly directed pins or the like adapted, on extending the side walls of the end section connected to the car, to engage recesses provided for said pins in said lateral walls.

If the supportng road wheel consists of a caster provided with a vertically extending swivel pin, two transverse leaf springs may be disposed at the rear end of the intermediate section, these leaf springs carrying centrally intermediate their ends the bearing sleeve for the swivel pin of said caster.

The invention will now be described more closely, reference being had to the accompanying drawings illustrating, by way of example only, a preferred embodiment thereof, and in which:

Figure 1 is a perspective view of a motor car equipped with a luggage rack according to the invention.

Figure 2 is a diagrammatic side view of the luggage rack having its sections arranged in an intermediate position.

Figure 3 is a similar view of the luggage rack in its position of being entirely extended.

Figure 4, on a larger scale, shows a vertical section through the luggage rack in its state of being folded together.

Figure 5:
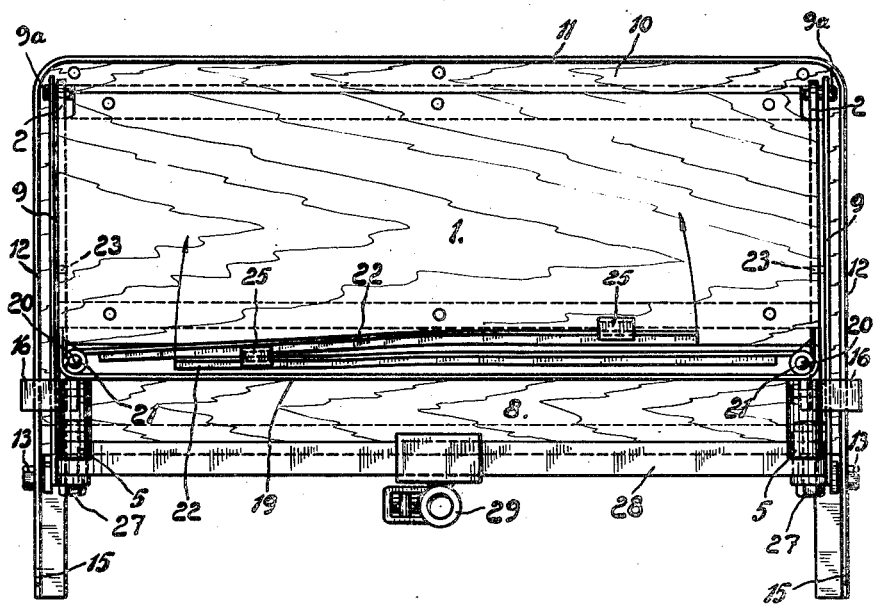

Figure 5 shows the luggage rack folded together in front view.

Figure 6 shows a side view, partly in section and partly broken away, of the luggage rack in a condition of having only its rear end section extended into its position of use.

Figure 7:
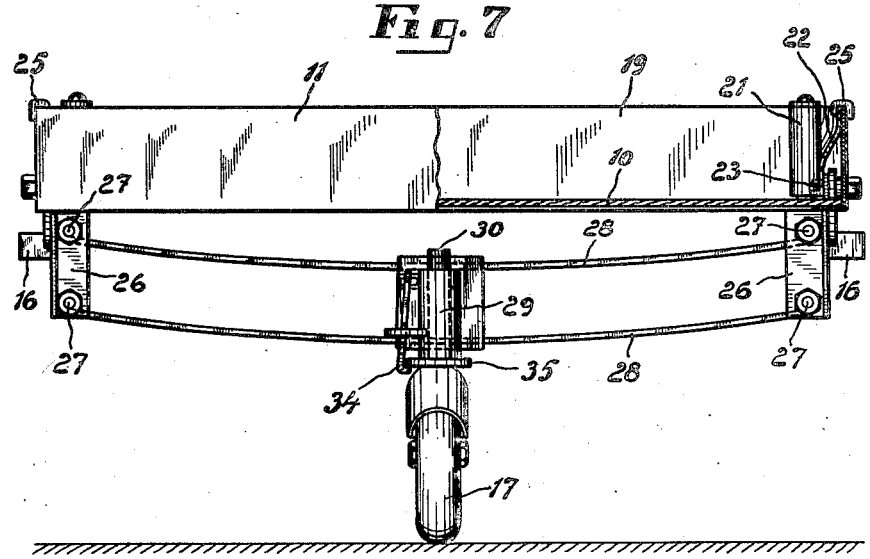

Figure 7 is a rear end view, partly broken away, of the luggage rack in its entirely extended condition, and Figures 8 and 9 show a side view and a top-plan view, respectively, of the luggage rack in its entirely extended condition.

Referring now to the drawings more specifically, there are three substantially rectangular sections of the luggage rack designated in Figures 1 to 3 by A, B and C respectively. The rack section A is provided with two frame members 2, one at each side, carrying a load supporting plate 1 and being at one end articulated by means of pins 3 to the rear ends of two arms 4, the latter being respectively provided at their front ends with sleeves 5 which are adapted to be slipped onto the upturned end portions 6 of two supporting arms 7, secured to the car, in such a manner as to enable the rack section A to be folded out from a substantially vertical position (see Figures 4 to 6) into a horizontal position (see Figures 2, 3 and 8). The intermediate section B, which is provided with two side plates 9 extending both upwardly and downwardly relative to the load supporting plate 8 of the intermediate section, is articulated at its front end to the rack section A by bolts 9a passed through the side plates 9 and the side frame members 2, whereby with the rack section A in its vertical position, the intermediate section B can be folded back upon the rear face of the former (see Figures 4 and 6). The end section C, the load supporting plate of which is designated by 10 and which is provided with a rear end wall 11, and two side walls 12 the front ends of which project forwardly beyond the load supporting plate 10 of the end section C and in overlapping relation to the side plates 9 of the intermediate section B, is articulated by means of pins 13 to the intermediate section B at the rear edge thereof, whereby, with the rack sections A and B in their vertically retracted position, the end section C may either be folded upwardly into a substantially vertical position as illustrated in full in Figure 1 and as shown in Figure 4, in which position the walls 11 and 12 enclose the rack sections A and B; or downwardly into a substantially horizontal position as shown in Figure 6 and as indicated in broken lines in Figure 1. On folding down the end section C into the last-mentioned position a pair of recesses 15 formed in the upper edges of the side walls 12, respectively, near the front ends thereof will be engaged by a pair of projections 16 extending laterally from the arms 4, so as to cause the rack sections A, B, C to be retained in this position and to enable the end section C to be utilized for carrying less bulky luggage.

Where bulkier luggage is concerned, all three rack sections are extended into their horizontal positions as shown in Figure 3 and in Figures 7 to 9, in which case a supporting road wheel 17 is mounted at the rear end of the intermediate section B by means of arrangements hereinafter described. For interlocking the rack sections in the last-mentioned position the following arrangements are made. At each front corner of the rack section A, which section is provided with an upstanding front wall 19, an upwardly directed pin 20 is provided, and hinged about these pins by means of respective sleeve-shaped end portions 21 are two elongated sheet-metal plates 22 which are pivotably movable from an inactive position (in which they lie in transversely overlapping relationship along the front wall 19—see Figure 2 and Figures 4 to 6) into a position in which they extend respectively along the edges of the load supporting plate 1 so as to form side walls to the rack section A. The length of the plates 22 is so dimensioned that, in their last-mentioned overlapping position, they will extend along the inside of the upper portion of the side plates 9, respectively, of the intermediate section B and also along the inside of the front end portions of the side walls 12, respectively, of the rear end section C. The side plates 9 of the intermediate section B are provided with inwardly directed pins 23 which are adapted, on the plates 22 being extended, to engage corresponding holes provided therein, whereby the plates 22 act to prevent the sections A and B from being moved angularly relatively to each other. Secured to each plate 22 at the rear of its upper edge is a hook 25, which is adapted to grip the upper edge of the adjacent side wall 12 of the rear end section C near the front end of the latter, whereby on the one hand, the plates 22 will be retained in their extended position, and on the other hand, the end section C will be prevented from being rocked downwardly past its horizontal position.

Secured to the rear end of each of the side plates 9 of the intermediate section B is a bracket 26, and by means of bolts 27 mounted therein the corresponding ends of two transversely extending leaf springs 28 are attached to said brackets. Centrally mounted on these springs intermediate their ends is a sleeve 29 serving as a swivel bearing for a swivel pin 30 which carries a fork 31 in which the shaft of a supporting wheel 17 is mounted. Attached to the sleeve 29 is a resilient arm 34 having a detent adapted releasably to grip a collar 35 on the swivel pin.

In order to extend the rack sections into the position illustrated in Figure 3 the operation is initiated from the entirely collapsed position shown in Figure 1, and the first step is to extend simultaneously the section A with the two sections B and C still folded together, into the position shown in Figure 2, in which position the swivel pin 30 of the caster wheel 17 is introduced into the bearing sleeve 29. Following this the end section C is unfolded upwardly to an extent enabling the plates 22 to be extended into their position along the inside of the lateral plates 9 of the intermediate section B, after which the end section C is unfolded down so as to cause the hooks 25 to grip the upper edges of the side walls 12.

It is understood that the invention is not restricted to the embodiment herein described and illustrated in the accompanying drawings, the same being susceptible of various modifications as to its details without departing from the scope of the invention.

What I claim is:

1. A foldable trailer for attachment to vehicles comprising front, intermediate and rear rectangular sections, said front section being pivotally connected at one transverse edge thereof to a transverse edge of said intermediate section for being folded against one another, the opposite transverse edge of said intermediate section being pivotally connected to said rear section for being folded against one another, means for pivotally connecting said front section at its second transverse edge to a vehicle and supporting said sections when folded together, a wheel pivotally and detachably connected to said intermediate section for conveying said sections over the ground, means for retaining said rear section in a load carrying position only when said other sections are folded together and means for retaining said sections in their load carrying position when pivoted to a position in line with one another.

2. A foldable trailer as claimed in claim 1 wherein pins are mounted on said front section adjacent the second transverse edge thereof and wall members are each pivotally connected to said pins for pivoting from said second transverse edge to the side edges of said front section forming side walls therefor.

3. A foldable trailer as claimed in claim 1 wherein side plates are provided each on a side of said intermediate section and wall members are pivotally connected to said front section adjacent its second transverse edge each for pivoting from said edge to a side of said front section and against one of said side plates forming side walls for said front and intermediate sections.

4. A foldable trailer as claimed in claim 1 wherein side plates are provided each on a side of said intermediate section, wall members are pivotally connected to said front section for pivoting thereacross and at times extending each along a side of said front section and against one of said side plates, pins are mounted on said side plates and said wall members each have recesses for receiving said pins for preventing the pivoting of said front and intermediate sections.

5. A foldable trailer as claimed in claim 1 wherein a pair of leaf springs are transversely connected to said intermediate section, a bearing sleeve is carried by said springs, a swivel pin freely extends into said sleeve and a caster is connected to said swivel pin with said wheel rotatably connected thereto.

References Cited in the file of this patent

UNITED STATES PATENTS

| | | |
|---|---|---|
| 1,233,645 | Cole | July 17, 1917 |
| 1,256,861 | Adams | Feb. 19, 1918 |
| 2,080,709 | Hall et al. | May 18, 1937 |
| 2,110,944 | Schultz | Mar. 15, 1938 |